April 29, 1952  R. G. MINER ET AL  2,594,477
AIR CONDITIONING APPARATUS
Filed March 9, 1950
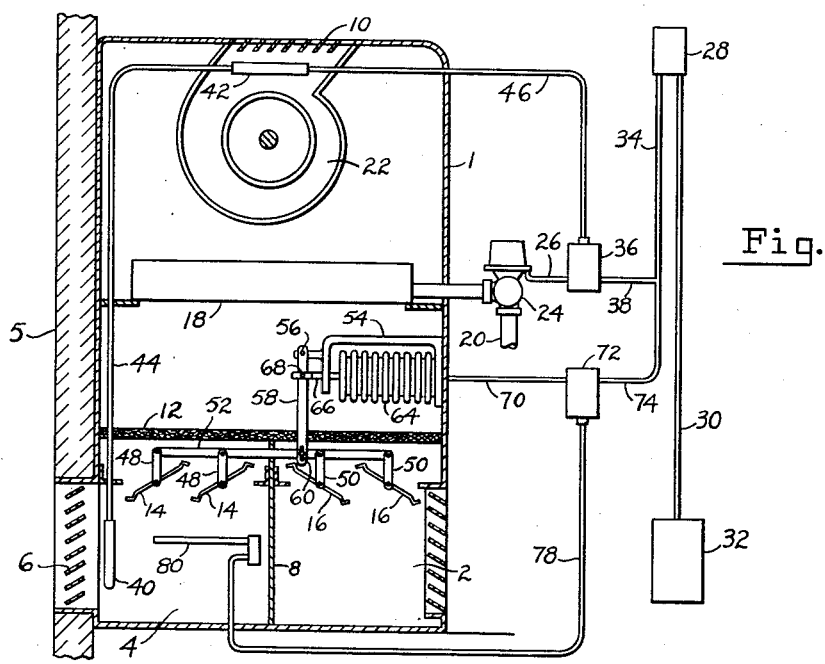
Fig. 1.
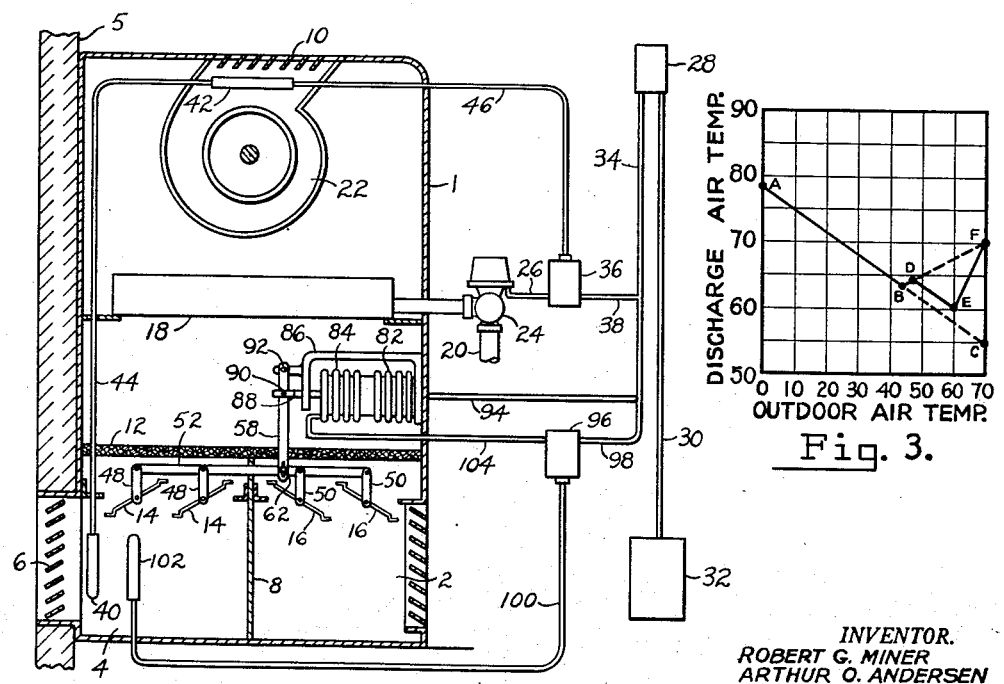
Fig. 2.
Fig. 3.
INVENTOR.
ROBERT G. MINER
ARTHUR O. ANDERSEN
BY Holmes + Andersen
ATTORNEYS Patented Apr. 29, 1952

2,594,477

UNITED STATES PATENT OFFICE 2,594,477

AIR-CONDITIONING APPARATUS

Robert G. Miner and Arthur O. Andersen, La Crosse, Wis., assignors to The Trane Company, La Crosse, Wis.

Application March 9, 1950, Serial No. 148,683

6 Claims. (Cl. 236—37)

The present invention relates to control means for ventilating and/or conditioning units. The invention is particularly concerned with units having a casing for the flow of air, said casing having an outside air intake opening, a recirculated air intake opening and a discharge opening. The unit has a fan for moving air through the casing and a heating element for heating the air passing through the casing.

The invention is an improvement over the control shown in the patent to McElgin #2,290,985, the operation of which will now be described. When the temperature of the room approaches the thermostat setting, the room thermostat supplies air pressure to the damper motor which opens the damper to its minimum outdoor air position. As the room temperature continues to rise, the steam valve serving the unit radiator modulates toward closed position. When the room temperature goes above the thermostat setting, the outdoor air inlet damper again starts moving to increase the quantity of outdoor air and to reduce the quantity of room air. An air stream thermostat having a first bulb exposed to the air leaving the heater and a second bulb exposed to the outside air prevents the air stream temperature from falling below a desired minimum by modulating the fresh air dampers toward the minimum setting. The second bulb in the outside air resets the air stream thermostat so that the minimum air stream control point rises as the outside air temperature falls. The air stream thermostat controls the steam valve and the dampers to maintain the desired minimum air stream temperature.

The control disclosed in the McElgin patent referred to above has the disadvantage that when the temperature of the room rises suddenly as caused for instance by a sudden increase in occupancy, the room thermostat will call for an increased amount of fresh air and the outside air dampers may open and discharge cold air into the room until the air stream thermostat has cooled sufficiently to again close the dampers to maintain the desired minimum air temperature.

This undesirable condition is avoided by our invention in which the outside air dampers cannot open beyond the minimum setting until the outside air temperature rises to the point where additional fresh air is necessary in order to obtain the desired minimum air stream temperature. This operation is accomplished by modulating the outside air damper by means of a thermostat in the outside air stream as will be described later in the specification. The outside air temperature has a slow rate of change compared to that of the discharge air stream and for this reason the outside air damper control of our invention is more accurate than the prior art control which is subject to "hunting" because of the rapid changes in discharge air temperature. When the fresh air damper is "hunting" the unit is either discharging cold air which causes drafts, or it is using steam when the room is overheated. Obviously both of these conditions are undesirable.

The primary object of this invention is to provide improved control means for ventilating and/or air conditioning units. A more particular object is to provide air stream temperature control means which, when the room temperature exceeds the thermostat setting, modulates the supply of heating fluid for outside air temperatures below a predetermined point and modulates the proportion of fresh air for outside temperatures above said predetermined point.

It is a further object of this invention to provide control means which operates in such a manner that the heating fluid cannot flow during periods when the room is overheated.

It is still another object of this invention to provide damper control means which cannot admit additional fresh air unless such additional fresh air is necessary for cooling the room.

Other objects and features will appear as the specification proceeds to describe the invention with reference to the accompanying drawing; in which—

Fig. 1 is a diagrammatic view of an improved automatic ventilating system according to our invention.

Fig. 2 is a diagrammatic view of a modification of the invention shown in Fig. 1.

Fig. 3 is a diagram showing the discharge temperature at various outdoor temperatures.

Referring now to the drawings in detail, particularly to Fig. 1, the casing 1 of the air conditioning unit may take the general form of a rectangular box having a recirculated air inlet 2 and an outdoor air inlet 4. The casing may be mounted adjacent a wall 5 and receives its outside air through an opening in the wall provided with inclined louvers 6. The openings 2 and 4 are separated by a wall or partition 8. The casing 1 has an opening 10 at the top for the egress of air. A filter 12 of any suitable and well known design extends across the casing above the openings 2 and 4. Pivoted dampers 14 control the amount of outdoor air admitted through openings 4, and pivoted dampers 16 control the amount of recirculated air admitted through opening 2. Within the casing 1 there is a radiator 18 which is preferably of the common and well known tube and fin construction. The radiator receives heating fluid, preferably steam, through a pipe 20. Near the top of the casing 1 is a blower system consisting of one or more centrifugal units 22 driven by an electric motor (not shown). Thus the mixture of inside and outdoor air as determined by the position of the dampers 14 and 16, passes through the heater 18 and is heated thereby. The air then enters the blower 22 which discharges the air from the casing 1 into the room through the opening 10. The pipe 20 contains a pneumatically controlled valve 24. The valve 24 is held in normally open position by a spring. The valve 24 is connected by means of pipe 26 to a pneumatic control system, and the pressure received through pipe 26 determines the extent to which valve 24 is closed.

A conventional direct acting room thermostat 28 of the pneumatic type is connected by a pipe 30 to a pressure tank 32 which is maintained at constant air pressure by a compressor (not shown). The room thermostat 28 puts a varying amount of pressure in a pipe 34 according to the heating or cooling requirements of the room. A direct acting thermostat 36 receives pressure from pipe 34 through a branch pipe 38. The thermostat 36 is a common and well known device, but for the purpose of identification it may be of the type shown in Fig. 4 of the patent to McElgin, No. 2,290,985. The thermostat 36 has liquid filled bulbs 40 and 42. Bulb 40 is exposed to the outdoor air in the outdoor air opening 4 and bulb 42 is exposed to the heated air being discharged to the inclosure from the casing of fan 22. Bulb 40 is connected by a capillary tube 44 to the bulb 42, and bulb 42 is connected by capillary tube 46 to the main portion of thermostat 36. When the bulb 40 and/or bulb 42 is exposed to increased temperature, the bellows of thermostat 36 expands to reduce the flow through the leak port and increase the pressure transmitted to valve 24 by branch pipe 26.

The control of the steam valve 24 will now be explained. When the room temperature rises and closely approaches the setting of the room thermostat the steam valve modulates toward fully closed position. In order to prevent the unit from discharging air which is so cold as to cause discomfort the thermostat 36 prevents the valve 24 from closing further when the air stream temperature tends to fall below a desired minimum. Since bulb 40 is exposed to the outside air, the setting of thermostat 36 is raised as the outside temperature falls. This increase in minimum air discharge temperature is necessary because a discharge temperature of 60° F. will not cause discomfort when the outside temperature is 55° F., whereas a discharge temperature as high as 85° F. may be necessary to prevent discomfort from "drafts" when the outside temperature drops to minus 30° F. This variation may be explained by the fact that the occupants of the room wear heavier clothing when the outside temperature is low. The higher minimum discharge temperature during periods of low outside temperature is also necessary, because of the increased cooling of the occupants caused by the increased radiant cooling effect of the walls of the enclosure.

A minimum discharge temperature which increases as the outside temperature decreases is also effective in counteracting the "drooping effect" of the room thermostat.

The construction of the control mechanism for the pivotally mounted dampers 14 and 16 now will be described. Arms 48 are fixed to the dampers 14 and arms 50 are fastened to the dampers 16. A connecting rod 52 is pivotally secured to the arms 48 and 50. A pneumatic motor of the bellows type has a base 54 secured to the casing 1. An arm 58 is pivoted to the base 54 at 56. The arm 58 has a slot 60 which slidably and pivotally receives a pin 62 which is fixedly secured to the connecting rod 52. The base 54 supports a bellows 64 which has a rod 66 secured to its free end. The rod 66 is pivoted to the arm 58 at 68. The bellows 64 is connected by a pipe 70 to a pneumatic repeater 72 commonly referred to as a relay or cumulator. Repeater or relay 72 has a minimum branch pressure adjustment and because it is an old and well known instrument in the art, it is not shown in detail. For the purpose of identification it may be of the type manufactured by the Johnson Service Company of Milwaukee, Wisconsin and designated by them as relay R-354. The operation of relay 72 will be described later in the specification. Relay 72 is connected to pipe 34 by pipe 74. Relay 74 is also connected by a pipe 78 to a leak port thermostat 80 which is an old and well known device. The leak port thermostat 80 may be of the type shown in Fig. 2 of the patent to McElgin, No. 2,290,985.

The operation of the control apparatus will now be described. When the room temperature is substantially below the setting of thermostat 28, the thermostat 28 prevents pressure from reaching pipes 34, 74, and 78 and the bellows 64 is collapsed. The bellows 64 being collapsed, the fresh air dampers 14 are completely closed, the recirculated air dampers are fully open and the unit is handling recirculated air only. Since there is no pressure in pipe 34, steam valve 24 is in fully open position.

As the room temperature closely approaches the setting of thermostat 28, thermostat 28 puts pressure in line 34 and the pressure reaches relay 72 through line 74. Relay 72 puts a minimum pressure in line 70 and bellows 64. Movement of bellows 64 as a result of this minimum pressure, opens dampers 14 to admit the desired minimum amount of fresh air, and moves the dampers 16 toward closed position. Relay 72 passes only the minimum pressure to bellows 64 until the outdoor temperature rises to a point where additional fresh air is necessary for cooling the room during periods when the room is overheated. When the outdoor temperature rises to this point, usually set at about 50°, the leak port thermostat 80 begins to close and causes the relay 72 to pass increased pressure to bellows 64 which opens the dampers 14 beyond their minimum fresh air position and closes the recirculated air dampers a corresponding amount. This increased opening of dampers 14 occurs only when the room thermostat indicates that cooling is required by putting increased pressure in the line 34. When the outside temperature reaches 60 and the room temperature is above the setting of the room thermostat, the recirculated air dampers are permitted to completely close and the unit is delivering 100% outdoor air.

The leak port thermostat 80 is set to control the dampers in such a manner that the temperature of the air mixture is normally above the minimum discharge temperature setting of the thermostat 36. The outside air dampers do not open to the point where the steam valve 24 would normally need to open to keep the discharge temperature from falling below the desired minimum.

The modification shown in Fig. 2 is similar to the unit of Fig. 1 except that the damper motor and control mechanism for the damper motor are different.

The damper motor has two separate bellows 82 and 84 supported on a base 86 which is fastened to the casing 1. A rod 88 is fastened to the free end of the bellows 84. The rod 88 is pivotally secured to the arm 58 at 90. The arm 58 is pivotally secured to the base 86 at 92. The damper motor is old and well known and is not shown in detail. For the purpose of identification it may be of the type disclosed in U. S. patent to A. J. Otto, Number 1,961,526.

Bellows 82 is connected by pipe 94 to pipe 34 leading from thermostat 28. A direct acting pneumatic thermostat 96 is connected by pipe 98 to the pipe 34 leading from the room thermostat 28. Since the thermostat 96 is a common and well known device, it has not been shown in detail. Thermostat 96 is provided with a capillary tube 100 and a bulb 102 located in the outdoor air opening 4. The thermostat 96 is connected to the interior of bellows 84 by a branch pipe 104.

The operation of the controls of the form of the invention of Fig. 2 will now be described. The control of the steam valve of this invention is identical to that of the form of the invention of Fig. 1 and further description is unnecessary. When the room temperature is substantially below the setting of the room thermostat 28, there is no pressure in the line 34, both bellows 82 and 84 are collapsed, the outdoor air dampers 14 are completely closed, and the recirculated dampers 16 are in fully open position. As the room temperature closely approaches the setting of the room thermostat 28, pressure is introduced to the line 34 and through line 94 to the bellows 82. Bellows 82 expands under pressure to the full movement of which it is capable and at this position the fresh air dampers 14 are open to an extent that the desired minimum amount of fresh air is admitted. When the outdoor air dampers 14 open to the minimum position, the recirculated air dampers 16 close a corresponding amount. The thermostat 96 does not put pressure in the branch line 104 unless the room temperature tends to go above the setting of the room thermostat and the outdoor air temperature is such that addition outdoor air is necessary to reduce the temperature of the air mixture to a point where effective cooling is obtained.

The operation of the unit at times when the room temperature tends to rise above the thermostat setting can best be described by referring to Fig. 3 in which the discharge air temperature is plotted against the outdoor air temperature. For purposes of description and illustration, it has been assumed that the unit is adjusted to admit a minimum of 25% outdoor air at all times when the room temperature is close to the thermostat setting. As the temperature of the outdoor air rises, the thermostat 36 controls the steam valve 20 so that the minimum discharge temperature follows along the line ABC. However as the outdoor air temperature rises beyond the point B, the mixed air temperature entering the unit would follow the line BDF if the outdoor air damper were maintained at its minimum setting of 25%. It is obvious that discharge temperatures along the line BDF would not be very effective in cooling the room when it tends to overheat. The damper control of this invention operates to open the outdoor air damper beyond its minimum setting when the outdoor air temperature rises above a certain point D which may be set as desired. As the outdoor air temperature increases from D to E the outdoor air damper moves from its minimum setting of 25% outdoor air at D to its fully open position at E at which point the unit is delivering 100% fresh air. The line DE indicates the temperature of the air entering the unit, and since the steam is shut off, the line DE also indicates the temperature of the air discharged from the unit. In Fig. 3 the line DE is above the line ABC which means that the dampers admit outdoor air and recirculated air in such quantities that the mixture has a temperature above that at which the thermostat 36 would admit steam to maintain the desired minimum discharge temperature of line ABC. There will, therefore, be no tendency for the steam valve to cycle on and off when the room tends to become overheated.

It should be understood that the damper control thermostat 72 of Fig. 1 and 96 of Fig. 2 can be set to admit a mixture having a temperature which is below the line ABC. In such a case the thermostat 36 would admit steam to the radiator to raise the temperature of the air to the line ABC. This setting of the controls would use some steam during periods when the temperature of the inclosure exceeds the thermostat setting, but it would have the advantage that increased quantities of outdoor air would be admitted.

Although we have described in detail the preferred embodiments of our invention, we contemplate that many changes may be made without departing from the scope or spirit of our invention and we desire to be limited only by the claims.

We claim:

1. An air conditioning unit comprising a radiator adapted to be connected to a source of heat exchange fluid, means for moving air through said unit, a valve for controlling the flow of heat exchange fluid through said radiator, a first thermostat responsive to the temperature of the enclosure served by said unit for controlling said valve, a second thermostat for controlling said valve, said second thermostat having a first temperature sensitive element in the air stream leaving said radiator, said second thermostat having a second temperature sensitive element in the outdoor air stream, damper means for admitting predetermined quantities of outdoor air and recirculated air to said unit, power means for adjusting said damper means, said power means being connected to said first thermostat and being controlled thereby, a third thermostat for controlling said power means, said third thermostat having a temperature sensitive element in the outdoor air stream.

2. An air conditioning unit comprising a radiator adapted to be connected to a source of heat exchange fluid, means for moving air through said unit, a valve for controlling the flow of heat exchange fluid through said radiator, a first motor for moving said valve, a first thermostat in the air in the enclosure served by said unit for controlling said first motor, a second thermostat subject to the temperature of the air leaving said radiator and the temperature of the outside air and serving to limit the effect of said first thermostat on the motor, damper means controlling in relatively inverse senses flows of outdoor air and recirculated air, a second motor for actuating said damper means, said first thermostat being connected to control said second motor, a third thermostat responsive to the temperature of the outdoor air for controlling said second motor.

3. An air conditioning unit for an enclosure comprising a radiator adapted to be connected to a source of heat exchange fluid, a fan for drawing air through said radiator and for discharging air from said unit, damper means for controlling the quantities of outdoor air and recirculated air admitted to said unit, valve means for controlling the flow of heat exchange fluid through said radiator, a first thermostat responsive to the temperature of the enclosure served by said unit for controlling said valve, a second thermostat for controlling said valve, said second thermostat having a first temperature sensitive element in the air discharged by said fan, said second thermostat having a second temperature sensitive element in the outdoor air for resetting the control point of said second thermostat, power means for adjusting said damper means, said first thermostat being connected to control said power means, a third thermostat controlling said power means, said third thermostat having temperature sensitive means only in the outdoor air whereby said third thermostat is responsive to the temperature of said outdoor air.

4. An air conditioning unit for an enclosure comprising a radiator adapted to be connected to a source of heat exchange fluid, means for moving air through said unit, a valve for controlling the flow of heat exchange fluid through said radiator, a first motor for controlling said valve, a first thermostat in the air of the enclosure served by said unit for controlling said first motor, a second thermostat for controlling said motor and serving to limit the effect of said first thermostat on said first motor, said second thermostat having a temperature sensitive element subject to the temperature of the air leaving said radiator and a second temperature sensitive element subject to the temperature of the outdoor air, damper means controlling in relatively inverse senses flows of outdoor air and recirculated air, a second motor for controlling the damper means, said first thermostat being connected to said second motor to control movement of said motor in a first range of movement, a third thermostat responsive to the outdoor air for controlling movement of said motor through a second range of movement.

5. An air conditioning unit for an enclosure comprising a radiator adapted to be connected to a source of heat exchange fluid, means for moving air through said unit, a valve for controlling the flow of heat exchange fluid through said radiator, a first motor for controlling said valve, a first thermostat in the air of the enclosure served by said unit for controlling said first motor, a second thermostat for controlling said first motor and serving to limit the effect of said first thermostat on said first motor, said second thermostat having a temperature sensitive element subject to the temperature of the air leaving said radiator and a second temperature sensitive element subject to the temperature of the outdoor air, damper means controlling in relatively inverse senses flows of outdoor air and recirculated air, a second motor for controlling the damper means, a relay connected to said first thermostat and to said second motor, a third thermostat responsive to the temperature of the outdoor air, said thermostat being connected to said relay to increase the effect of said first thermostat on said second motor when the outdoor temperature exceeds a predetermined temperature.

6. An air conditioning unit for an enclosure comprising a radiator adapted to be connected to a source of heat exchange fluid, means for moving air through said unit, a valve for controlling the flow of heat exchange fluid through said radiator, a first motor for controlling said valve, a first thermostat in the air of the enclosure served by said unit for controlling said first motor, a second thermostat for controlling said first motor and serving to limit the effect of said first thermostat on said first motor, said second thermostat having a temperature sensitive element subject to the temperature of the air leaving said radiator and a second temperature sensitive element subject to the temperature of the outdoor air, damper means controlling in relatively inverse senses flows of outdoor air and recirculated air, a second motor for controlling said damper through a first range of movement said second motor being connected to be controlled by said first thermostat, a third motor for controlling said damper through a second range of movement, a third thermostat for controlling said third motor, said third thermostat having a temperature sensitive element subject to the outdoor air temperature.

ROBERT G. MINER.
ARTHUR O. ANDERSEN.

REFERENCES CITED

The following references are of record in the file of this patent:

UNITED STATES PATENTS

| Number | Name | Date |
|---|---|---|
| 1,936,544 | Shurtleff | Nov. 21, 1933 |
| 2,038,578 | Lamb | Apr. 28, 1936 |